United States Patent [19]

Tsai

[11] 4,375,235
[45] Mar. 1, 1983

[54] REGENERATOR FLOW DISTRIBUTION BY MEANS OF A BURNER

[75] Inventor: Yih W. Tsai, O'Hara Township, Allegheny County, Pa.

[73] Assignee: PPG Industries, Inc., Pittsburgh, Pa.

[21] Appl. No.: 305,241

[22] Filed: Sep. 24, 1981

[51] Int. Cl.³ .............................................. F28D 17/04
[52] U.S. Cl. ...................................... 165/1; 165/9.3; 432/181
[58] Field of Search ............................ 165/1, 9.3, 9.4; 432/180, 181, 182, 165

[56] References Cited

U.S. PATENT DOCUMENTS

| 296,174 | 4/1884 | Jones | 432/181 |
|---|---|---|---|
| 1,836,412 | 12/1931 | Trinks . | |
| 1,914,956 | 6/1933 | Naismith et al. | 432/165 |
| 2,491,705 | 12/1949 | Bloom | 432/181 X |
| 2,813,708 | 11/1957 | Frey . | |
| 4,047,560 | 9/1977 | Tsai . | |
| 4,088,180 | 5/1978 | Tsai . | |
| 4,174,948 | 11/1979 | Bradley et al. . | |
| 4,256,173 | 3/1981 | Tsai et al. . | |
| 4,257,476 | 3/1981 | Tsai . | |
| 4,298,372 | 11/1981 | Stover et al. . | |

FOREIGN PATENT DOCUMENTS 246243 4/1912 Fed. Rep. of Germany ...... 432/180

Primary Examiner—Albert W. Davis, Jr.
Attorney, Agent, or Firm—Dennis G. Millman

[57] ABSTRACT

In a regenerative furnace of the type used for melting glass, localized overheating of the regenerator packing is minimized, heating of the regenerator packing is made more uniform, and regenerator efficiency is improved by employing a gas stream, preferably a high velocity burner, in the plenum of the regenerator to control gas flow distribution within the regenerator.

14 Claims, 5 Drawing Figures

REGENERATOR FLOW DISTRIBUTION BY MEANS OF A BURNER

BACKGROUND OF THE INVENTION

This invention relates to regenerative furnaces and their operation and, in particular, to the type of regenerative furnace commonly employed in the manufacture of flat glass. The regenerators used in such furnaces are usually comprised of a gas pervious bed of refractory material, such as a stacked arrangement of bricks sometimes called "checker packing," through which hot exhaust gases are passed during one phase of a firing cycle in order to heat the packing. In the alternate phase of the firing cycle, the flow is reversed and the heat stored in the packing serves to preheat combustion air passing through the regenerator. The regenerators are generally employed in pairs with one on either side of the combustion chamber of the furnace. While one regenerator is absorbing heat from the exhaust gas, the other is heating incoming air.

Because flat glass furnaces typically include a relatively large number of burner ports (usually about 4–8 on each side) spaced several feet apart from one another in a row, the length of a regenerator bed associated therewith usually has a length which is several times greater than its height or width. Because of construction expediencies, the main flue carrying gases to and from each regenerator is usually located at one end of the regenerator. This arrangement unfortunately results in a tendency of gases in portions of the regenerators to flow longitudinally and to by-pass portions of the packing. Hot exhaust gases tend to flow in greater amounts through the portions of the packing near the flue, causing those portions to become hotter than other portions of the packing. This unbalanced condition is aggravated by the fact that the flow of cool, incoming combustion air during the firing phase tends to be biased toward the opposite end of the packing from the flue inlet. As a result, the flue end portion of the packing tends to reach higher peak temperatures as well as maintaining higher minimum temperatures over the firing cycle. Because of the high temperatures, the flue end portion of the packing tends to deteriorate faster than others, thereby shortening furnace life and often acting as a restriction on the operation of a furnace. Furthermore, because the stored heat is concentrated in one portion of the packing, the efficiency with which air is preheated during the firing phase is reduced, thereby reducing the overall thermal efficiency of the furnace. It is an object of the present invention to overcome these disadvantages.

U.S. Pat. Nos. 1,836,412 and 2,813,708 relate to modifying flow patterns in regenerators. Both employ rigid baffles designed primarily for the purpose of rendering the air flow through the checker packing more uniform during the firing phase. It is not apparent, however, how such arrangements could sufficiently influence flow in the opposite direction through the packing during the exhaust phase to avoid concentrating heat at the flue end of the packing. Moreover, such baffle arrangements could change the gas flow pattern in the space beneath the packing during the exhaust phase, thereby promoting lateral flow of exhaust gases along the space above the packing and then into the packing at the flue end.

Arrangements in which a plurality of flues are provided to distribute gas flows through regenerators are disclosed in U.S. Pat. Nos. 4,174,948; 4,256,173; and 4,257,476. Each of these arrangements requires a substantial rebuilding of the regenerator structure, which may not be practical for existing furnaces and is unsuitable for furnaces that are currently operating continuously. Furthermore, it would be desirable if flow distribution could be achieved without the substantial additional structure required by these arrangements.

In U.S. Pat. Nos. 4,047,560 and 4,088,180 there is shown a movable baffle for diverting air flows during the firing phase of a regenerator. It would be preferred to avoid the use of movable parts, particularly in such a harsh environment where durability can be a problem.

It is also known to provide regenerators with partitions so that each burner port is associated with a corresponding regenerator packing section. While such an arrangement can provide positive control of flow distribution, its use is discouraged by the fact that plugging or collapse of one of the regenerator packing sections can essentially remove a burner port from service, thereby severely crippling the operation of a furnace. For these reasons, it is preferred to employ a unitary, unpartitioned bed of packing in common communication with a plurality of burner ports.

SUMMARY OF THE INVENTION

In the present invention, gas flows in a regenerator are made more uniform by employing auxiliary burner means, or the like, to counteract longitudinal flow tendencies in the plenum space joining a row of burner ports to a bed of packing. The burner is located at or near the flue end of the packing and is directed along the length of the regenerator substantially parallel to the adjacent side of the packing. Hot gases issuing from the burner are directed countercurrent to the undesired longitudinal flow through the plenum during the exhaust phase of the firing cycle and, as a result, directly impede this longitudinal flow so that gases pass more uniformly through the packing. Although the primary benefit of the auxiliary burner is obtained during the exhaust phase, some benefit is also obtained during the firing phase, and the burner may be employed continuously during the entire firing cycle. During the firing phase, entrainment of gases by the auxiliary burner in the region adjacent to the flue end of the packing produces a low pressure zone that induces greater amounts of incoming combustion air to be drawn through that portion of the packing and correspondingly diminishes the amount of air passing through the opposite end of the packing.

Advantageously, the flow control means of the present invention can be added readily to an existing operating furnace with no disruption of operation and at relatively low cost. The cost of operating the flow control burner is minor compared to the improved regenerator efficiency and prolonged furnace life obtainable with the present invention. The use of hot combustion gases as the flow control stream has advantages, but in some cases it may be possible to use an unheated stream of air or other gas.

The subject matter of this invention is related to that of concurrently filed U.S. Patent Application Ser. No. 305,242 of Yih-Wan Tsai entitled "Regenerator Flow Distribution by Means of Air Jets."

THE DRAWINGS

DETAILED DESCRIPTION

Figure 1:
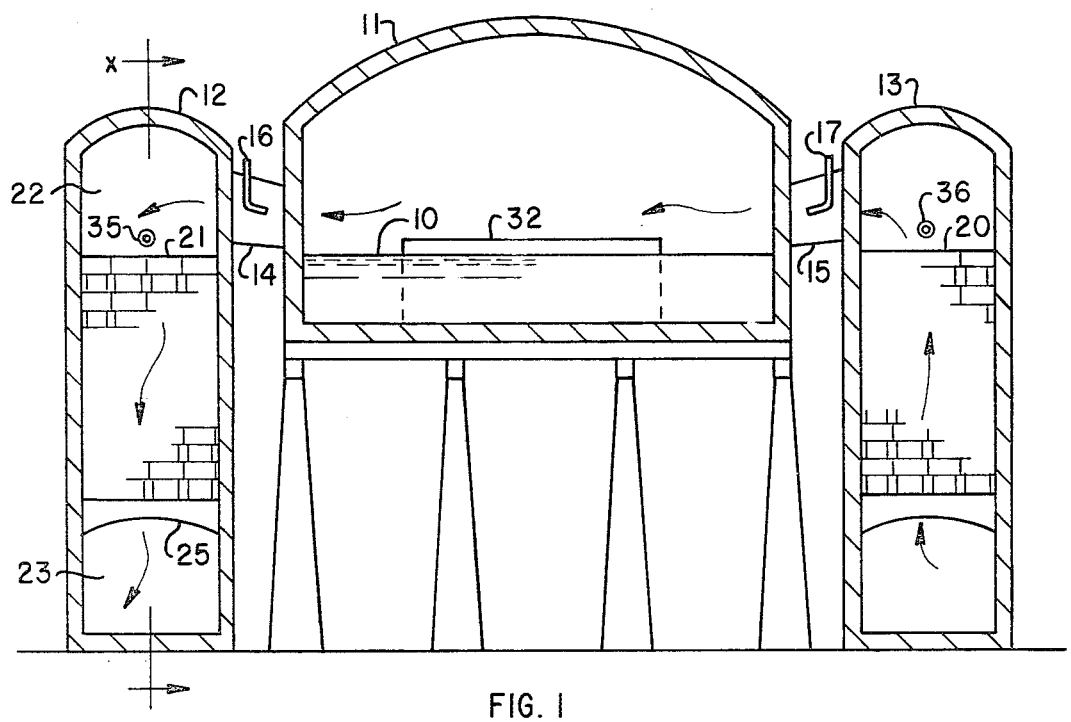
FIG. 1 is a schematic, transverse, vertical section across the width of a cross-fired, regenerative, glass melting furnace, showing an example of flow control burner placement in accordance with the present invention.

The regenerative furnace shown in the drawings is typical of melting furnaces used in the flat glass industry. It should be understood that such a furnace is being described as an illustrative example and that the invention is applicable to regenerative furnaces of other types.

In FIG. 1 a pool of molten and partially melted glass 10 is contained in a melter 11, the interior of which is the main combustion chamber of the furnace. The furnace also includes a pair of regenerators 12 and 13 flanking the melter and which communicate with the melter by means of a respective plurality of burner ports 14 and 15. Fuel for combustion is supplied by fuel lines 16 and 17, respectively, to burners within each port. As shown in FIG. 1, the regenerator 12 is in the exhaust phase of the firing cycle and the regenerator 13 is in the firing phase of the firing cycle. Air for combustion passes upwardly through regenerator 13 where it is preheated by passing over a previously heated, gas-pervious brickwork checker packing 20 made of refractory materials, and then passes through ports 15 where it combines with fuel from fuel line 17 at the mouth of each port. Flames issue a considerable distance into the interior of the melter 11 and hot exhaust gases pass through ports 14 and into the opposite regenerator 12 where the exhaust gases heat another brickwork checker packing 21. Fuel line 16 is inoperative during this portion of the firing cycle. After several minutes of operation the flows are reversed, fuel is supplied through lines 16, and fuel lines 17 are inactivated. During this second phase of the firing cycle, regenerator 12 serves to preheat incoming combustion air and regenerator 13 serves to capture waste heat from the exhaust gases passing therethrough. After several more minutes of operation, the direction of flow is again reversed, and so on.

Structurally, the regenerators 12 and 13 may essentially be mirror images of each other and, therefore, the description of additional structural features of regenerator 12 herein applies to regenerator 13 as well. Typical of glass melting furnace regenerators is the geometry wherein the width of the bed of packing, as shown in FIG. 1, is considerably less than its length, as shown in FIGS. 2-5. This is due to the fact that each regenerator is in communication with an elongated row of ports, typically 4 to 8 ports on each side of the furnace. Above the packing 21 is an elongated plenum 22 by way of which each of the ports 14 are in common communication with the packing 21. At the opposite side of the packing is a gas distributing space 23 which opens at one end to a flue 24 (FIGS. 2-5). The packing is supported by a series of arches 25.

In FIGS. 2-5 there is shown a schematic representation of the feeding means for the melter 11. This includes an inlet extension portion 30 of the melter, glass batch feeding means 31, and an inlet opening 32.

Figure 2:
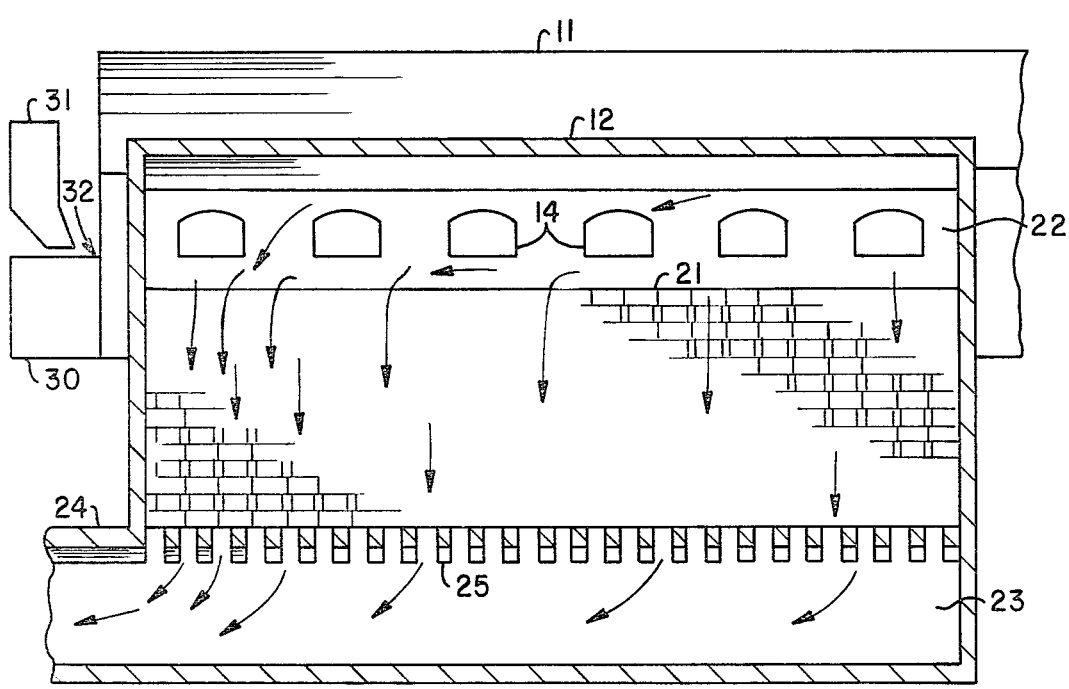
FIG. 2 is a vertical, longitudinal section of a regenerator taken along line x—x in FIG. 1, showing a typical flow pattern during an exhaust phase of the regenerator without the flow control means of the present invention.
Figure 3:
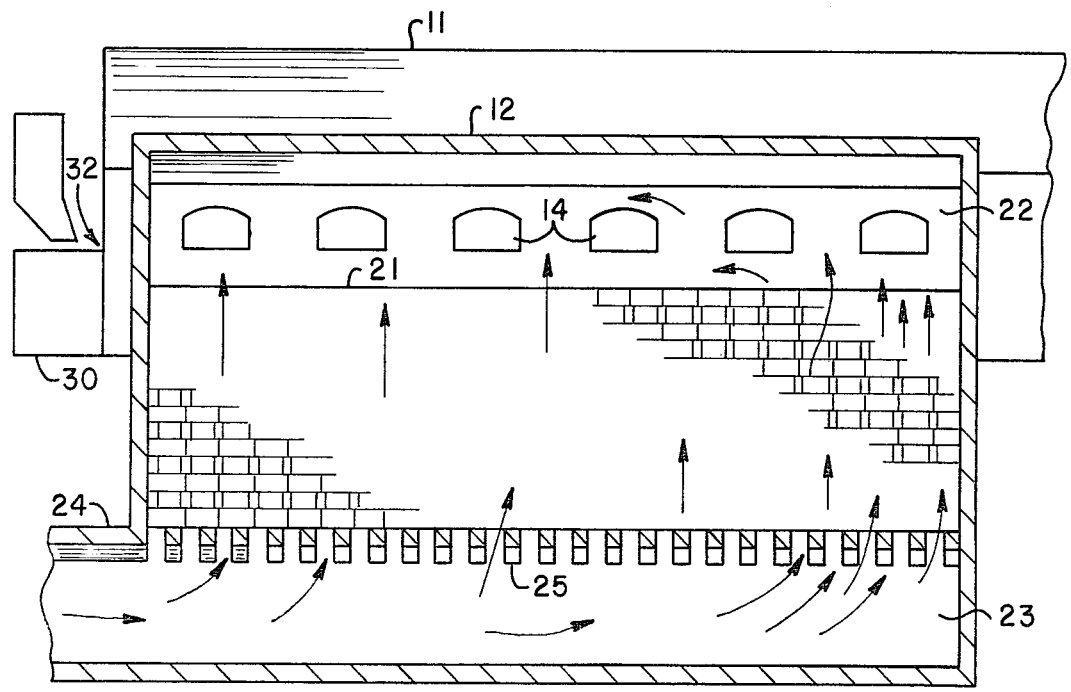
FIG. 3 is a vertical, longitudinal section of the same regenerator taken along line x—x in FIG. 1, showing a typical flow pattern during a firing phase without the flow control means of the present invention.

FIG. 2 depicts an approximation of the flow pattern during an exhaust phase of the firing cycle without the improvements of the present invention. A portion of the exhaust gases tend to be drawn longitudinally along the plenum 22 toward the flue end of the regenerator and then down into the packing near the flue end. The resulting greater amount of exhaust gases flowing through the flue end of the packing causes that portion of the packing and the underlying arches 25 to become hotter than the remainder of the regenerator. When the flows are reversed in the firing phase as shown in FIG. 3, the flow of incoming air through the packing, and therefore the cooling effect, has been found to be somewhat biased toward the opposite end of the packing from the flue. As a result, the packing near the flue end has been found to remain continually at a higher temperature than the rest of the packing. The region of this inefficient and, sometimes, harmful concentration of heat is, of course, not discrete and depends upon the particular configuration of a regenerator, but it can be said to consist generally of about the first one third of the packing from the flue end. Specific data showing an example of the thermal imbalance within this type of regenerator are set forth in U.S. Pat. No. 4,047,560 and are incorporated herein by reference.

Figure 4:
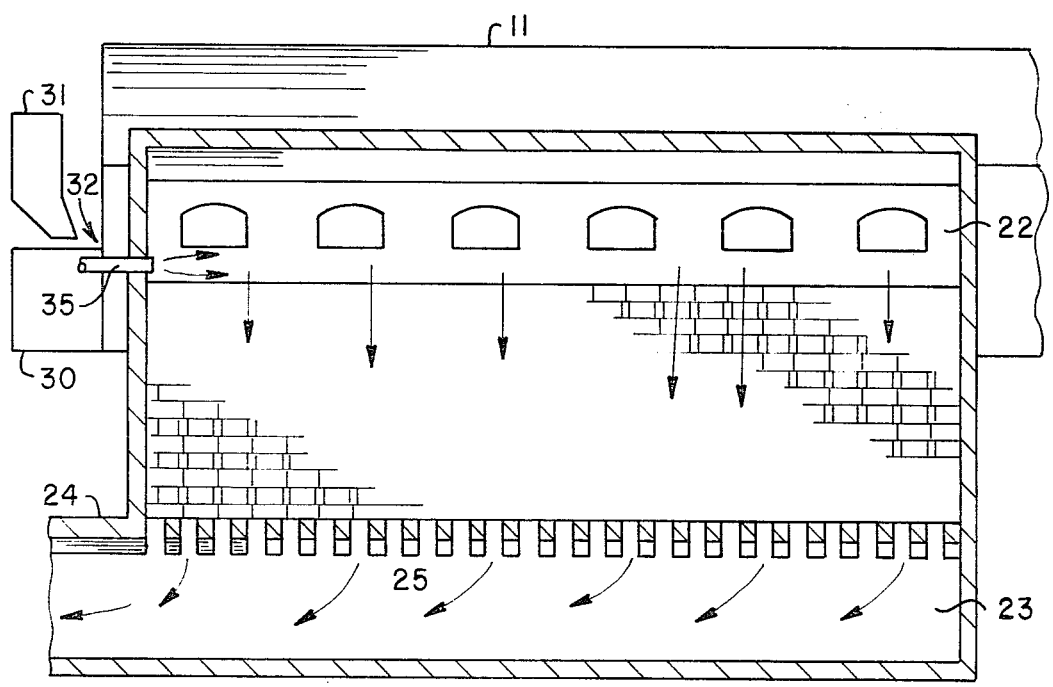
FIG. 4 is the same view of the regenerator shown in FIG. 2, showing the flow pattern during an exhaust phase with a flow control burner operating in accordance with the present invention.

In FIG. 4 there is shown a flow control burner 35 inserted through an end wall of the regenerator in accordance with a preferred embodiment of the present invention. FIG. 4 illustrates the approximate effect of the flow control burner on the exhaust gas flow pattern through the packing 21 during the exhaust phase, which may be compared with that of FIG. 2. The hot gases issuing from the burner 35 are directed substantially parallel to the length of the plenum 22 directly counter to the undesirable exhaust gas flow along the length of the plenum. The burner 35 increases the resistance against exhaust gases attempting to flow along the plenum toward the flue end of the packing, thereby forcing more of the exhaust gas to pass through the opposite end of the packing. The result is a more uniform flow distribution of exhaust gases through all portions of the packing and a reduction in the temperature difference between the flue end of the regenerator and the opposite end.

Figure 5:
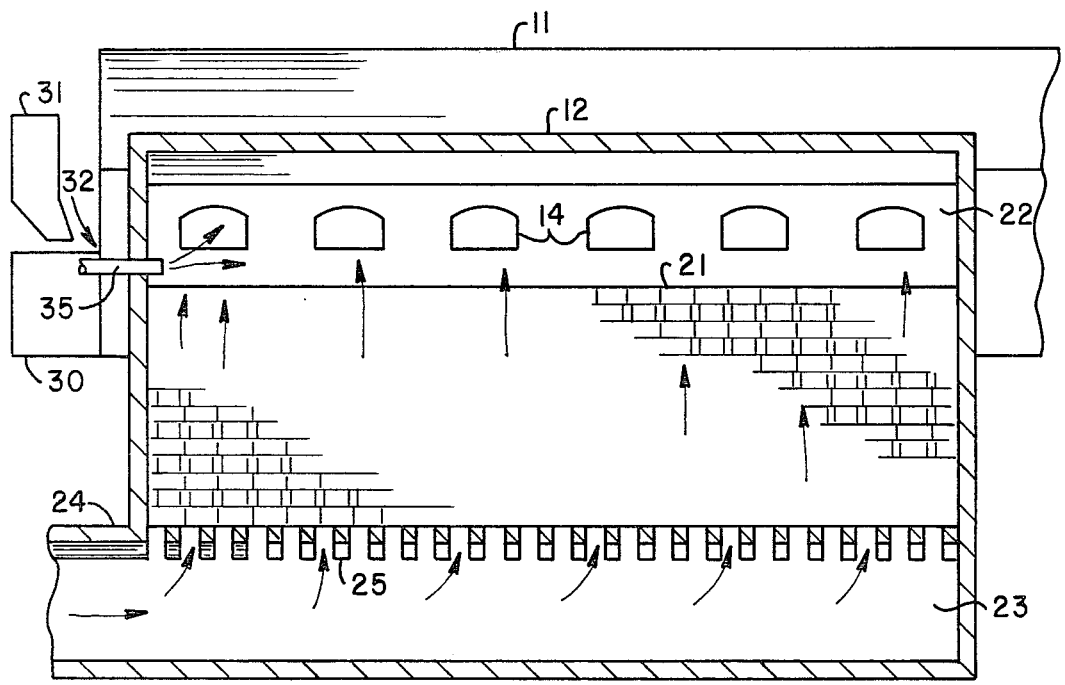
FIG. 5 is the same view of the regenerator shown in FIG. 3 showing the flow pattern during a firing phase with a flow control burner operating in accordance with the present invention.

Although substantial benefits can be obtained by operating the auxiliary flow control burner 35 during the exhaust phase only, it has been found beneficial to operate the burner continuously during the entire firing cycle. In FIG. 5, an approximate representation is shown of the effect of the flow control burner on the flow of incoming combustion air through the regenerator during the firing phase. It is believed that the gases issuing from the burner 35 produced an entrainment effect on the surrounding gases, thereby creating a low pressure zone in the vicinity of the plenum 22 above the flue end of the packing. This low pressure zone induces greater flow rates of incoming air up through the flue end of the packing, thereby diminishing the tendency of the incoming air flow to favor the opposite end of the packing as shown in FIG. 3. Therefore, the flow control burner has the twofold effect of avoiding excessive flow rates of exhaust gases through the flue end of the packing and of inducing greater flow rates of cool, incoming air through the flue end of the packing, both of which tend to diminish the tendency of the flue end packing to overheat. Furthermore, by inducing greater amounts of incoming air to flow through the hotter portions of the packing, the effectiveness of the heat recovery by the regenerator is improved.

In most cases it would be preferred to employ a second flow control burner 36 in the other regenerator 13, but it is, of curse, not essential that the invention be applied to both regenerators. Instead of a single flow control burner in the plenum of each regenerator, it may be preferred in some cases to employ two or more burners in each to distribute the counterflow effect over a wider area. The preferred location for the flow control burners is in the end wall of the plenum directly above the entrance to the flue 24. In principle, a burner could be located at an intermediate location along the plenum, but maintaining the burner against the harsh environment may present difficulties. When a single burner is used in a plenum, it has been found desirable to locate the burner close to the packing in order to optimize the flow control effect. By locating the burner within one half and preferably one fourth of the plenum's height closest to the packing, laterally flowing exhaust gases are prevented from passing between the packing and the flow stream from the flow control burner. For example, in a plenum about 2.4 meters high, a suitable location for the flow control burner has been found to be about 0.3 meters above the packing.

The volume of gases issuing from the flow control means depends upon their velocity and the degree of flow control desired. At higher velocities, less volume is required, which is advantageous in that less disturbance to the overall furnace operation is created. The volume of the control gas stream may be kept below 5% of the total volume of combustion air input to the furnace by employing velocities greater than about 100 feet per second (30 meters per second). At velocities in excess of 300 feet per second (90 meters per second) the volume may be as little as 0.5% of the total combustion air volume flow rate. It is expected that optimum performance would be obtained at velocities greater than 300 feet per second (90 meters per second).

It is desirable for the flow control gas stream to be a relatively low temperature combustion exhaust gas stream, such as the output from an excess air burner. Since a purpose of the invention is to alleviate localized overheating of the regenerator packing, the flow control burner should not increase the temperature of exhaust gas normally passing through that portion of the regenerator. Therefore, in a typical furnace, the control burner exhaust gas temperature should be less than 2000° F. (1100° C.) and preferably less than 1500° F. (820° C.). Good results have been obtained with exhaust gas temperatures in the vicinity of 900° F. to 1200° F. (480° C. to 650° C.). The exhaust gas temperature is controlled by feeding excess air to the burner beyond that required for combustion of the fuel (e.g., natural gas). Combustion may take place within a portion of the burner outside the regenerator, not at the burner outlet. Theoretically there is no lower limit to the control burner exhaust temperature and, thus, no upper limit to the air/fuel ratio. Therefore, the flow control stream could be simply air or another gas without combustion. But the use of a heated gas stream is preferred in order to avoid thermal shock to the adjacent portions of the packing and to avoid cooling the incoming preheated air during the firing phase. A combustion flame is a convenient means for providing a heated gas stream, but other means could be employed such as an electrically heated gas stream.

The following is a specific example of a set of parameters employed successfully with a flat glass melting furnace producing about 600 tons per day (540 metric tons per day) having eight ports, otherwise configured as illustrated in the drawings. A burner having a nozzle diameter of 4 inches (10.16 centimeters) was fueled with 485 cubic feet per hour (13.7 cubic meters per hour) of natural gas and 27,000 cubic feet per hour (760 cubic meters per hour) of air which produced an output gas temperature of 920° F. (493° C.) and a velocity of 232 feet per second (70.7 meters per second). The arch supporting the packing directly below the first port from the flue end of the regenerator was observed to be 42° C. lower in temperature during operation of the burner than without the burner.

Specific embodiments have been described herein in order to disclose the best mode of practicing the invention, but it should be understood that other variations and modifications as are known to those in the art may be resorted to without departing from the scope of the invention defined by the claims which follow.

I claim:

1. A method of operating a regenerator of the type which includes a gas pervious bed of refractory material, a gas distributing space communicating with the bed along its length at one side, a flue communicating with the gas distributing space at one end thereof, a plenum communicating with the bed along its length at the opposite side of the bed from the distributing space, a plurality of ports opening onto the plenum at spaced-apart locations along the length of the plenum and communicating with a combustion furnace; wherein the regenerator participates in a periodically reversing firing cycle including an exhaust phase in which hot exhaust gases pass from the furnace through the ports into the plenum and then through the bed to the distributing space and out of the regenerator through the flue, and a firing phase wherein incoming combustion air enters the regenerator through the flue and then passes from the distributing space through the bed to the plenum and then to the furnace by way of the ports; the improvement comprising: impeding the flow of exhaust gases along the plenum in the direction of the flue end of the regenerator during the exhaust phase by directing a stream of gases within the plenum in a countercurrent direction, thereby maintaining a more uniform distribution of exhaust gas flow through the bed.

2. The method of claim 1 wherein the countercurrent stream of gases is additionally employed during the firing phase, thereby enhancing the flow of incoming combustion air through the packing at the flue end of the regenerator.

3. The method of claim 1 or 2 wherein the countercurrent gas stream is provided by a combustion burner.

4. The method of claim 3 wherein the output gas temperature of the burner is no greater than the temperature of exhaust gases passing through the plenum.

5. The method of claim 4 wherein the output gas temperature of the burner is less than 2000° F. (1100° C.).

6. The method of claim 5 wherein the output gas temperature of the burner is less than 1500° F. (820° C.).

7. The method of claim 6 wherein the output gas temperature of the burner is at least 900° F. (480° C.).

8. The method of claim 3 wherein the burner is operated with excess air.

9. The method of claim 1 or 2 wherein the countercurrent gas stream has a velocity of at least 100 feet per second (30 meters per second).

10. The method of claim 1 or 2 wherein the countercurrent gas stream has a velocity of at least 300 feet per second (90 meters per second).

11. The method of claim 1 or 2 wherein the countercurrent gas stream comprises no more than 5% by volume of the total combustion air volume throughput in the furnace.

12. The method of claim 1 or 2 wherein the volume of the countercurrent gas stream is no greater than 1% of the total combustion air throughput to the furnace.

13. The method of claim 1 or 2 wherein the countercurrent gas stream enters the plenum through an end wall of the regenerator directly above the junction of the flue with the distributing space.

14. The method of claim 1 or 2 wherein the counterflow gas stream is injected into the plenum at a location that is within the half of the plenum closest to the bed.

* * * * *